United States Patent
Bak et al.

(10) Patent No.: US 10,102,148 B2
(45) Date of Patent: Oct. 16, 2018

(54) PAGE-BASED COMPRESSED STORAGE MANAGEMENT

(71) Applicant: Microsoft Technology Licensing, LLC, Redmond, WA (US)

(72) Inventors: Yevgeniy M. Bak, Redmond, WA (US); Mehmet Iyigun, Kirkland, WA (US); Landy Wang, Honolulu, HI (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 467 days.

(21) Appl. No.: 13/917,149

(22) Filed: Jun. 13, 2013

(65) Prior Publication Data

US 2014/0372715 A1  Dec. 18, 2014

(51) Int. Cl.
| | |
|---|---|
| *G06F 13/00* | (2006.01) |
| *G06F 12/126* | (2016.01) |
| *G06F 12/02* | (2006.01) |
| *G06F 12/08* | (2016.01) |

(52) U.S. Cl.
CPC .......... *G06F 12/126* (2013.01); *G06F 12/023* (2013.01); *G06F 12/08* (2013.01); *G06F 2212/401* (2013.01)

(58) Field of Classification Search
CPC ...... G06F 12/126; G06F 12/023; G06F 12/08; G06F 2212/401
See application file for complete search history.

(56) References Cited

U.S. PATENT DOCUMENTS

| | | |
|---|---|---|
| 5,101,485 A | 3/1992 | Perazzoli, Jr. |
| 5,125,086 A | 6/1992 | Perazzoli |
| 5,247,687 A | 9/1993 | Eilert et al. |
| 5,388,242 A | 2/1995 | Jewett |
| 5,394,537 A | 2/1995 | Courts et al. |
| 5,517,643 A | 5/1996 | Davy |

(Continued)

FOREIGN PATENT DOCUMENTS

| | | |
|---|---|---|
| CN | 100530142 | 8/2009 |
| EP | 0097256 | 1/1984 |

(Continued)

OTHER PUBLICATIONS

"International Search Report and Written Opinion", Application No. PCT/US2015/021129, dated May 28, 2015, 10 Pages.

(Continued)

*Primary Examiner* — Nanci N Wong

(57) ABSTRACT

A memory is made up of multiple pages, and different pages can have different priority levels. A set of memory pages having at least similar priority levels are identified and compressed into an additional set of memory pages having at least similar priority levels. The additional set of memory pages are classified as being the same type of page as the set of memory pages that was compressed (e.g., as memory pages that can be repurposed). Thus, a particular set of memory pages can be compressed into a different set of memory pages of the same type and corresponding to at least similar priority levels. However, due to the compression, the quantity of memory pages into which the set of memory pages is compressed is reduced, thus increasing the amount of data that can be stored in the memory.

20 Claims, 6 Drawing Sheets

(56) References Cited

U.S. PATENT DOCUMENTS

| | | |
|---|---|---|
| 5,555,399 A | 9/1996 | Waldron et al. |
| 5,594,881 A | 1/1997 | Fecteau |
| 5,628,023 A | 5/1997 | Bryant |
| 5,696,926 A | 12/1997 | Culbert |
| 5,758,174 A | 5/1998 | Crump |
| 5,802,599 A | 9/1998 | Cabrera et al. |
| 5,826,057 A | 10/1998 | Okamoto et al. |
| 5,966,735 A | 10/1999 | Noel et al. |
| 6,128,713 A | 10/2000 | Eisler et al. |
| 6,330,572 B1 | 12/2001 | Sitka |
| 6,349,372 B1 | 2/2002 | Benveniste |
| 6,442,664 B1 | 8/2002 | Maynard et al. |
| 6,473,842 B1 | 10/2002 | Tsutsumi |
| 6,496,909 B1 | 12/2002 | Schimmel |
| 6,496,912 B1 | 12/2002 | Fields, Jr. et al. |
| 6,516,397 B2 | 2/2003 | Roy |
| 6,564,305 B1 | 5/2003 | Moore |
| 6,681,239 B1 | 1/2004 | Monroe et al. |
| 6,877,081 B2 | 4/2005 | Herger |
| 6,956,507 B2 | 10/2005 | Castelli et al. |
| 6,968,424 B1 | 11/2005 | Danilak |
| 7,024,512 B1 | 4/2006 | Franaszek |
| 7,185,155 B2 | 2/2007 | Sechrest et al. |
| 7,197,590 B2 | 3/2007 | Chiu |
| 7,437,529 B2 | 10/2008 | Burugula et al. |
| 7,475,183 B2 | 1/2009 | Traut et al. |
| 7,587,572 B1 | 9/2009 | Stenstrom |
| 7,610,437 B2 | 10/2009 | Sinclair et al. |
| 7,624,240 B1 | 11/2009 | Colbert et al. |
| 7,698,513 B2 | 4/2010 | Sechrest et al. |
| 7,797,510 B1 | 9/2010 | Case et al. |
| 7,895,242 B2 | 2/2011 | Ergan et al. |
| 8,015,367 B1 | 9/2011 | Rao et al. |
| 8,099,568 B2 | 1/2012 | Colbert et al. |
| 8,386,740 B2 | 2/2013 | Devendra et al. |
| 8,484,405 B2 | 7/2013 | Mashtizadeh et al. |
| 8,495,267 B2 | 7/2013 | Abali et al. |
| 8,516,005 B2 | 8/2013 | Ergan et al. |
| 8,539,186 B2 | 9/2013 | Sechrest et al. |
| 8,832,411 B2 | 9/2014 | Iyigun et al. |
| 9,081,702 B2 | 7/2015 | Iyigun et al. |
| 9,632,924 B2 | 4/2017 | Bak et al. |
| 9,684,625 B2 | 6/2017 | Bak et al. |
| 2002/0065867 A1* | 5/2002 | Chauvel ............... G06F 1/206 |
| | | 718/104 |
| 2002/0073298 A1 | 6/2002 | Geiger et al. |
| 2002/0147893 A1 | 10/2002 | Roy et al. |
| 2003/0037060 A1 | 2/2003 | Kuehnel |
| 2003/0061457 A1* | 3/2003 | Geiger ................. G06F 12/08 |
| | | 711/165 |
| 2003/0079081 A1 | 4/2003 | Okada |
| 2004/0030847 A1 | 2/2004 | Tremaine |
| 2004/0068627 A1 | 4/2004 | Sechrest et al. |
| 2005/0132161 A1 | 6/2005 | Makela et al. |
| 2006/0161912 A1 | 7/2006 | Barrs et al. |
| 2007/0005911 A1 | 1/2007 | Yang |
| 2007/0156386 A1 | 7/2007 | Guenthner |
| 2009/0112949 A1* | 4/2009 | Ergan ................. G06F 12/0802 |
| 2009/0327621 A1 | 12/2009 | Kliot et al. |
| 2011/0072235 A1* | 3/2011 | Deming ............. G06F 12/1027 |
| | | 711/207 |
| 2011/0107007 A1 | 5/2011 | van Riel et al. |
| 2011/0113432 A1 | 5/2011 | Ergan et al. |
| 2011/0153978 A1 | 6/2011 | Chalemin et al. |
| 2011/0238943 A1 | 9/2011 | Devendran et al. |
| 2011/0271070 A1 | 11/2011 | Worthington et al. |
| 2012/0036325 A1 | 2/2012 | Mashtizadeh et al. |
| 2012/0151127 A1 | 6/2012 | Lim |
| 2012/0233438 A1 | 9/2012 | Bak et al. |
| 2012/0239899 A1 | 9/2012 | Adderly et al. |
| 2013/0031293 A1* | 1/2013 | Van Riel ............... G06F 12/10 |
| | | 711/6 |
| 2013/0036299 A1 | 2/2013 | Itoh |
| 2013/0159662 A1 | 6/2013 | Iyigun et al. |
| 2013/0326170 A1* | 12/2013 | Kilari ............... G06F 12/0246 |
| | | 711/161 |
| 2014/0006745 A1 | 1/2014 | Fontenot et al. |
| 2014/0052946 A1 | 2/2014 | Kimmel |
| 2014/0149634 A1* | 5/2014 | Tosatti ............... G06F 9/45558 |
| | | 711/6 |
| 2014/0164686 A1 | 6/2014 | Choi et al. |
| 2014/0189195 A1 | 7/2014 | Chen et al. |
| 2014/0189281 A1* | 7/2014 | Sokol, Jr. ............ G06F 12/08 |
| | | 711/171 |
| 2014/0244603 A1 | 8/2014 | Arges et al. |
| 2014/0282589 A1 | 9/2014 | Kuang et al. |
| 2014/0351552 A1 | 11/2014 | Iyigun et al. |
| 2015/0106582 A1 | 4/2015 | Mai et al. |
| 2015/0178222 A1 | 6/2015 | Hopper et al. |
| 2015/0242432 A1 | 8/2015 | Bak et al. |
| 2015/0269111 A1 | 9/2015 | Bak et al. |
| 2016/0259720 A1 | 9/2016 | Bak et al. |
| 2016/0306738 A1 | 10/2016 | Bak et al. |

FOREIGN PATENT DOCUMENTS

| | | |
|---|---|---|
| EP | 0346039 | 12/1989 |
| EP | 0723229 | 7/1996 |
| EP | 1406174 | 4/2004 |
| KR | 102011008598 | 7/2011 |
| KR | 101221241 | 1/2013 |
| WO | 1995018997 A2 | 7/1995 |

OTHER PUBLICATIONS

"Non-Final Office Action", U.S. Appl. No. 11/933,364, (dated Jul. 22, 2010), 10 pages.

"Non-Final Office Action", U.S. Appl. No. 13/006,229, (dated Oct. 1, 2012), 15 pages.

"Non-Final Office Action", U.S. Appl. No. 13/006,229, (dated May 25, 2012), 6 pages.

"Notice of Allowance", U.S. Appl. No. 11/933,364, (datd Nov. 16, 2010), 6 pages.

"Notice of Allowance", U.S. Appl. No. 13/006,229, (dated Apr. 4, 2013), 12 pages.

"Supplemental Notice of Allowance", U.S. Appl. No. 13/006,229, (dated Jul. 9, 2013), 2 pages.

De Castro, Rodrigo S., et al., "Adaptive Compressed Caching: Design and Implementation", *IEEE*, Retrieved from <http://linuxcompressed.sourceforge.net/docs/files/paper.pdf>, (2003), 15 pages.

Freedman, Michael J., et al., "The Compression Cache: Virtual Memory Compression for Handheld Computers", *MIT Lab for Computer Science*, Retrieved from <http://www.scs.stanford.edu/mfreed/docs/6.033/compression.pdf>, (Mar. 16, 2000), 16 pages.

Tuduce, Irina C., et al., "Adaptive Main Memory Compression", Retrieved from <http://www.lst.int.ethz.ch/research/publications/publications/USENIX_2005/USENIX_2005.pdf>, (2005), 14 pages.

Wilson, Paul R., et al., "The Case for Compressed Caching in Virtual Memory Systems", *USENIX Association*, Jun. 6-11, 1999. Retrieved from <http://www.usenix.org/events/usenix99/full_papers/wilson/wilson.pdf>, (1999), 33 pages.

"International Search Report & Written Opinion for PCT Patent Application No. PCT/US2013/060505", dated Feb. 7, 2014, Filed Date: Sep. 19, 2013, 10 Pages.

Notice of Allowance, U.S. Appl. No. 13/326,182, dated Feb. 7, 2014, 7 pages.

Dilger, Daniel Eran., "Compressed Memory in OS X 10.9 Mavericks Aims to Free RAM, Extend Battery Life" Retrieved From: <http://appleinsider.com/articles/13/06/12/compressed-memory-in-os-x-109-mavericks-aims-to-free-ram-extend-battery-life> Jan. 22, 2014, Jun. 12, 2013, 10 pages.

"Notice of Allowance", U.S. Appl. No. 13/326,182, dated Jul. 2, 2014, 7 Pages.

"Working Set", Retrieved From: ,http://msdn.microsoft.com/en-us/library/windows/desktop/cc441804(v=vs.85).aspx> Feb. 19, 2014, Nov. 16, 2013, 1 Page.

(56) References Cited

OTHER PUBLICATIONS

Speight, et al., "Delphi: Prediction-Based Page Prefetching to Improve the Performance of Shared Virtual Memory Systems", In Proceedings: International Conference on Parallel and Distributed Processing Techniques and Applications, Jul. 25, 2013, 7 Pages.
"Foreign Office Action", CN Application No. 201210540976.9, dated Dec. 3, 2014, 13 Pages.
"Notice of Allowance", U.S. Appl. No. 14/456,128, dated Mar. 6, 2015, 8 pages.
"Understanding Memory Resource Management in VMware ESX 4.1", Retrieved at <<http://www.vmware.com/files/pdf/techpaper/vsp_41_perf_memory_mgmt.pdf>>, Retrieved date: Mar. 21, 2013, pp. 25.
Russinovich, Mark, "Inside the Windows Vista Kernel: Part 2", Retrieved at <<http://technet.microsoft.com/en-us/magazine/2007.03.vistakernel.aspx>>, Mar. 2007, pp. 8.
Tuduce, Irina, "Adaptive Main Memory Compression", Retrieved at <<http://www.lst.ethz.ch/research/publications/DISS_ETH_16327/DISS_ETH_16327.pdf>>, In Doctoral Dissertation, Swiss Federal Institute of Technology Zurich, Retrieved date: Mar. 21, 2013, pp. 141.
Gupta, Nitin., "Compcache: In-Memory Compressed Swapping", Retrieved at <<http://lwn.net/Articles/334649/>>, May 26, 2009, pp. 6.
"The Standby List and Storage Overprovisioning", Retrieved at <<http://fsfilters.blogspot.in/2012/04/standby-list-and-storage.html>>, Apr. 19, 2012, pp. 5.
"Final Office Action", U.S. Appl. No. 13/042,128, dated Nov. 21, 2013, 15 pages.
"HP OpenVMS System Services Reference Manual", Retrieved from <http://h71000www7.hp.com/doc/83final/4527/4527pro_022.html>> on Dec. 1, 2011, 7 pages.
"International Search Report and Written Opinion", Application No. PCT/US2012/069602, dated May 30, 2013, 10 pages.
"Microsoft Working Set", Retrieved from <<http://msdn.microsoft.com/en-us/library/windows/desktop/cc441804%28d=printer,v=vs.85%29>> May 22, 2014, 2 pages.
"Non Final Office Action", U.S. Appl. No. 13/042,128, dated May 2, 2014, 13 pages.
"Non-Final Office Action", U.S. Appl. No. 13/042,128, dated Apr. 3, 2013, 12 pages.
"Non-Final Office Action", U.S. Appl. No. 13/326,182, dated Aug. 16, 2013, 5 pages.
"Notice of Allowance", U.S. Appl. No. 13/326,182, dated May 9, 2014, 7 Pages.
Azimi, et al., "PATH: Page Access Tracking to Improve Memory Management", Proc. 6th Intl Symposium on Memory Management, Oct. 2007, 10 pages.
Clark, et al., "Selective Page Updating", IP.com Prior Art Database Technical Disclosure, 1987, 3 Pages.
Jenner, et al., "Address Space Suballocation in a Virtual Storage Environment", IP.com Prior Art Database Technical Disclosure, 1973, 6 Pages.
"Non-Final Office Action", U.S. Appl. No. 14/456,128, dated Oct. 7, 2014, 5 pages.
"International Preliminary Report on Patentability", Application No. PCT/US2015/021129, dated Feb. 29, 2016, 6 pages.
"International Preliminary Report on Patentability", Application No. PCT/US2015/016237, dated Feb. 23, 2016, 8 pages.
"International Search Report and Written Opinion", Application No. PCT/US2015/016237, dated Nov. 5, 2015, 10 pages.
"Non-Final Office Action", U.S. Appl. No. 14/221,829, dated Feb. 26, 2016, 27 pages.
"Non-Final Office Action", U.S. Appl. No. 14/187,031, dated Nov. 30, 2016, 18 pages.
"Final Office Action", U.S. Appl. No. 14/221,829, dated Sep. 22, 2016, 29 pages.
"Office Action Issued in European Patent Application No. 13773957.9", dated Feb. 27, 2017, 7 Pages.
"Notice of Allowance Issued in U.S. Appl. No. 14/221,829", dated Mar. 9, 2017, 8 Pages.
"Office Action Issued in European Patent Application No. 13773957.9", dated Oct. 2, 2017, 5 Pages.
"Non-Final Office Action Issued in U.S. Appl. No. 14/187,031", dated May 17, 2017, 8 Pages.
"Final Office Action", U.S. Appl. No. 14/187,031, dated Jan. 12, 2018, 9 pages.
"Final Office Action", U.S. Appl. No. 14/685,977, dated Mar. 7, 2017, 13 pages.
"Hack 92 Getting the Most Out of Your RAM", Retrieved from <http://www.csie.ntu.edu.tw/~b90047/ebook/winXPhack/0596005113_winxphks-chp-11-sect-3.html> on Oct. 28, 2014, May 8, 2007, 3 pages.
"How to determine the appropriate page file size for 64-bit versions of Windows", Retrieved from <> on Oct. 28, 2014, Nov. 27, 2013, 3 pages.
"How VMware vSphere is saving physical memory?", Retrieved from <http://www.unixarena.com/2014/07/how-vmware-vsphere-is-saving-physical-memory.html> on Oct. 28, 2014, Jul. 31, 2014, 3 pages.
"International Preliminary Report on Patentability", Application No. PCT/US2016/024597, dated Aug. 23, 2016, 6 pages.
"International Search Report and Written Opinion", Application No. PCT/US2016/024597, dated May 18, 2016, 12 pages.
"Non-Final Office Action", U.S. Appl. No. 14/635,302, dated Aug. 15, 2016, 9 pages.
"Non-Final Office Action", U.S. Appl. No. 14/685,977, dated Aug. 28, 2017, 13 pages.
"Non-Final Office Action", U.S. Appl. No. 14/685,977, dated Sep. 15, 2016, 11 pages.
"Notice of Allowance", U.S. Appl. No. 14/635,302, dated Dec. 28, 2016, 5 pages.
"VMware vSphere 4—ESX and vCenter Server—Memory Compression", Retrieved from <http://pubs.vmware.com/vsphere-4-esx-vcenter/index.jsp?topic=/com.vmware.vsphere.resourcemanagement.doc_41/managing_memory_resources/c_memory_compression.html> on Oct. 28, 2014, 2009, 1 page.
Denneman,"Disable ballooning?", Retrieved from <http://frankdenneman.nl/2010/11/29/disable-ballooning/> on Oct. 28, 2014, Nov. 29, 2010, 12 pages.
Huffman,"How to Size Page Files on Windows Systems", Retrieved from <http://mcpmag.com/articles/2011/07/05/sizing-page-files-on-windows-systems.aspx> on Oct. 28, 2014, Jul. 5, 2011, 9 pages.
Russinovich,"Pushing the Limits of Windows: Virtual Memory", Retrieved from <http://blogs.technet.com/b/markrussinovich/archive/2008/11/17/3155406.aspx> on Oct. 28, 2014, Nov. 17, 2008, 10 pages.
"Foreign Office Action", CN Application No. 201380077440.0, Mar. 6, 2018, 11 pages.
"Foreign Office Action", EP Application No. 15715015.2, Mar. 9, 2018, 5 pages.

* cited by examiner

PAGE-BASED COMPRESSED STORAGE MANAGEMENT

BACKGROUND

As computer technology has advanced, the performance of computer processors has increased. The performance of such computer processors, however, is sometimes hindered by other bottlenecks in the computer. For example, the speed of data transfer from hard disk drives into random access memory (RAM) is a bottleneck in computer performance. One way to reduce the impact of bottlenecks in the computer is to store more data in RAM. However, the cost of RAM remains high enough that it is typically cost prohibitive to use very large amounts of RAM in computers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a first set of memory pages is identified. The first set of memory pages is compressed into a region made up of a second set of memory pages. After substantially filling the region with compressed memory pages, a memory manager is allowed to repurpose the second set of memory pages. A request can also be received from the memory manager for at least one memory page of the first set of memory pages. In response to the request, the compressed at least one memory page is retrieved, decompressed, and returned to the memory manager.

In accordance with one or more aspects, a computing device includes a memory, a memory manager configured to manage pages of the memory, and a compressed storage manager. The compressed storage manager is configured to identify multiple memory pages each of which has a corresponding priority level of multiple priority levels. The compressed storage manager is further configured to identify a first set of memory pages each having at least similar priority levels of the multiple priority levels, and compress the first set of memory pages into a region made up of a second set of memory pages each having the at least similar priority levels of the multiple priority levels. After substantially filling the region with compressed memory pages, a memory manager is allowed to repurpose the second set of memory pages.

BRIEF DESCRIPTION OF THE DRAWINGS

The same numbers are used throughout the drawings to reference like features.

DETAILED DESCRIPTION

Page-based compressed storage management is discussed herein. A memory in a system is made up of multiple blocks or portions referred to as memory pages (or simply pages), and different memory pages can have different priority levels. Memory pages can be classified as different types, such as being able to be repurposed (e.g., re-used for something else, such as for the same or a different program or for other use in the system), or not being able to be repurposed. A set of memory pages having at least similar priority levels are identified and compressed into an additional set of memory pages having at least similar priority levels. The additional set of memory pages are classified as being the same type of page as the set of memory pages that was compressed, and the set of memory pages that were compressed is freed, allowing a memory manager of the system to do anything with the set of memory pages. Thus, a particular set of memory pages can be compressed into a different set of memory pages of the same type (e.g., standby or re-assignable) and corresponding to at least similar priority levels. However, due to the compression, the quantity of memory pages into which the set of memory pages is compressed is reduced, thus increasing the amount of data that can be stored in the memory.

Figure 1:
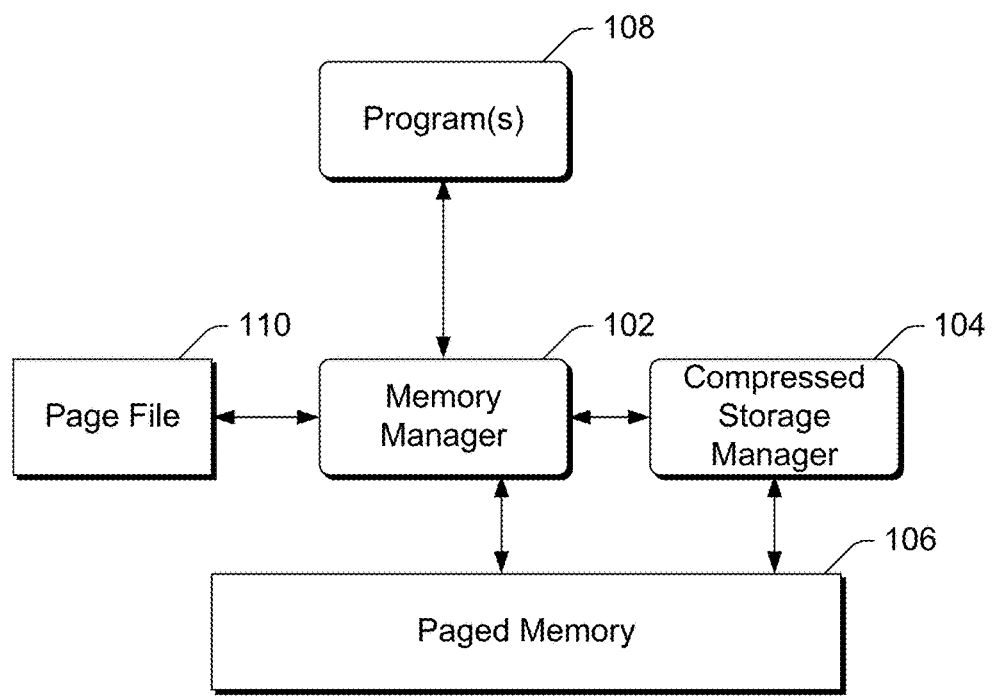
FIG. 1 illustrates an example system employing page-based compressed storage management in accordance with one or more embodiments.

FIG. 1 illustrates an example system 100 employing page-based compressed storage management in accordance with one or more embodiments. The system 100 includes a memory manager 102, a compressed storage manager 104, and paged memory 106. Generally, the memory manager 102 manages storage of data in the paged memory 106. The memory manager 102 allocates portions of the paged memory 106 to various programs 108 in the system 100. The programs 108 can be applications, operating system programs, or other components or modules. The memory manager 102 can receive requests from these programs 108 to retrieve data from the paged memory 106 and to write data to the paged memory 106. The memory manager 102 also allocates one or more portions of the paged memory 106 to the compressed storage manager 104 for storage of data in compressed form, as discussed in more detail below. The paged memory 106 can be, for example, any type of CPU (Central Processing Unit) addressable memory, such as volatile memory (e.g., RAM) or nonvolatile memory (e.g., Flash memory).

The system 100 represents one or more devices. In one or more embodiments, the components 102-108 illustrated in the system 100 are included as part of the same computing device. Alternatively, the components can be spread across two or more devices.

In one or more embodiments, memory manager 102 manages paged memory 106 using paging. The memory manager 102 organizes the memory 106 (e.g., RAM) into pages, which are a particular (e.g., fixed) size unit of data. The act of paging refers to reading data in units of pages from the backing file or page file (e.g., page file 110) for particular types of data (e.g., private data) when the data is not in the memory 106. The act of paging also refers to writing dirty data back in units of pages into the backing file or page file (e.g., page file 110) for particular types of data (e.g., private pages storing private data, or pages storing image or data files). Such paging techniques are well known to those skilled in the art.

In the discussions herein, reference is made to the manager 102 being a memory manager, and the blocks or portions of memory being memory pages (e.g., pages of RAM). It is to be appreciated that the techniques discussed herein apply to various types of storage resources (e.g., other types of memory), and that the paged memory 106 can be any of a variety of types of storage resources. Using the techniques discussed herein, the memory pages refer to blocks or portions of any storage resource, with the memory manager 102 managing which blocks or portions are stored in the storage resource at any given time, coordinating the transfer of blocks or portions from the storage resource to another storage source (e.g., a disk drive), and coordinating the retrieval of blocks or portions from the other storage source to the storage resource.

The paged memory 106 includes multiple pages that can each be classified as one of multiple different types of pages at any given time, and this classification can change over time. One type of memory page is a working or assigned page, which is a memory page that has been allocated to a program 108 and is currently being used by the program 108. A memory page currently being used refers to a memory page that has been accessed by the program 108 within a threshold amount of time (e.g., the previous 20 seconds), or is otherwise being accessed by the program 108 in such a manner that the memory page is not to be repurposed by the memory manager 102. Repurposing a memory page refers to the memory page being re-used by the memory manager 102 for something else, such as storing different data for the same or a different program or for other use in the system.

Another type of memory page is a standby or re-assignable page, which is a memory page that has been allocated to a program 108 and is not currently being used by the program 108. A memory page not currently being used refers to a page that has not been accessed by the program 108 within a threshold amount of time (e.g., the previous 20 seconds), or is otherwise being accessed by the program 108 in such a manner that the memory page can be repurposed by the memory manager 102. A memory page can be repurposed by, for example, being assigned to be a different type of page (e.g., working or assigned), being allocated to a different program, and so forth.

Another type of memory page is a modified or dirty page, which is a memory page the contents of which have been modified but not yet copied to the page file 110. A modified or dirty memory page is not to be repurposed by the memory manager 102. However, after copying a modified or dirty memory page to the page file 110, the classification of the memory page can be changed to a standby or re-assignable page. Another type of memory page is a free or de-allocated page, which is a memory page that is not currently allocated to a program 108, and with which the memory manager 102 can do anything (including being repurposed).

The memory manager 102 uses various rules or criteria to determine when memory pages of the paged memory 106 are allocated to programs 108, which memory pages are allocated to which programs 108, which memory pages previously allocated to a program 108 are to be repurposed, and so forth. The memory manager 102 also determines the classification for types of memory pages, changing the classifications of memory pages as appropriate. In one or more embodiments, the memory manager 102 maintains a list or other record of which memory pages of the paged memory 106 are classified as which type of page. For example, the memory manager 102 can maintain a list or other record of working or assigned pages, a list or other record of standby or re-assignable pages, a list or record of modified or dirty pages, a list or record of free or de-allocated pages, and so forth.

One or more pages of the paged memory 106 each have a corresponding priority level. Only particular types of memory pages (e.g., standby or re-assignable pages) may have priority levels, or alternatively all types of memory pages may have priority levels. The memory manager 102 sets the priority level for each memory page, and can determine the priority level for a memory page in a variety of different manners. In one or more embodiments, the priority level for a memory page is the priority level assigned by an operating system to the process or thread that requested allocation of the memory page. Alternatively and/or additionally, other criteria can be used to determine the priority level for a memory page, such as a request from a program 108, the memory page being associated with a particular type of retrieval (e.g., speculative retrieval of pages), and so forth. The memory manager 102 can also change the priority levels of memory pages over time (e.g., lowering the priority levels of memory pages not accessed by a program 108 for a threshold amount of time).

Figure 2:
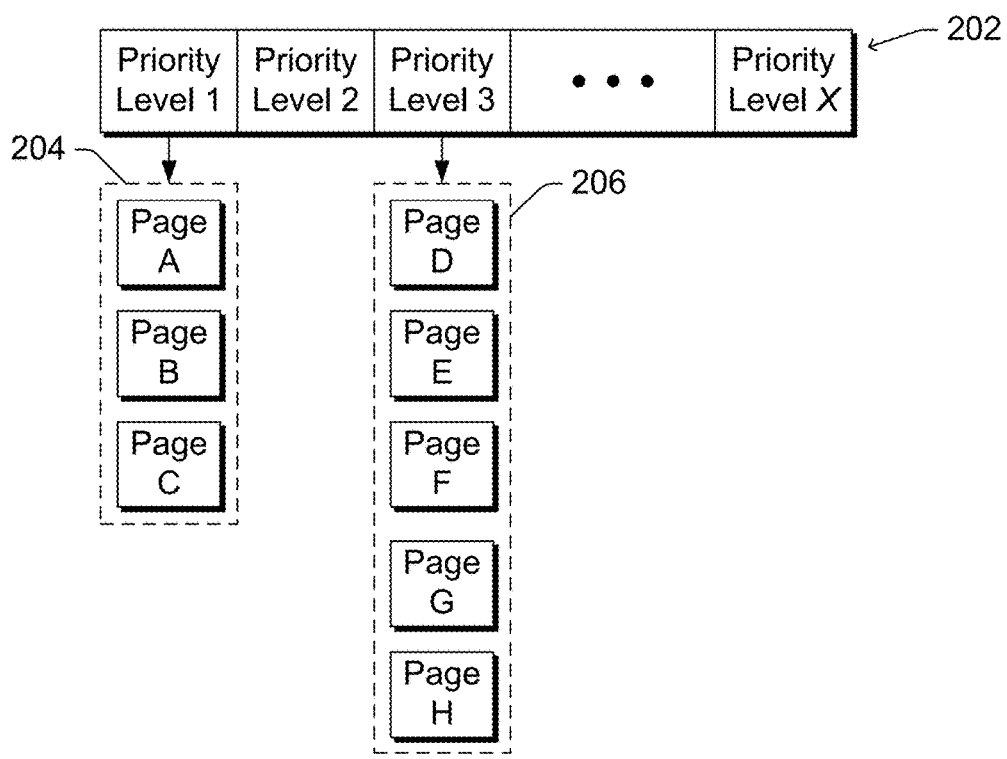
FIG. 2 illustrates an example record of paged memory in accordance with one or more embodiments.

FIG. 2 illustrates an example record 200 of paged memory in accordance with one or more embodiments. A set of multiple (X) priority levels 202 are illustrated, the set of priority levels 202 include the priority levels that can correspond to pages. The record 200 of paged memory is a record of, for example, standby or re-assignable pages of the paged memory 106 of FIG. 1. Priority levels with larger numbers can be higher priority than priority levels with smaller numbers (e.g., priority level 4 can be higher priority than priority level 1), or vice versa. Alternatively, labels other than numbers can be used to identify priority levels, such as letters or other characters.

For each priority level 202, the record 200 identifies a set of zero or more memory pages having that priority level. For example, pages 204 correspond to priority level 1, pages 206 correspond to priority level 3, and so forth. The record 200 can be maintained in any of a variety of different manners, such as a list or other data structure identifying memory pages corresponding to a particular priority level, using different storage areas (e.g., different caches) for memory pages corresponding to different priority levels, and so forth.

Returning to FIG. 1, in one or more embodiments the compressed storage manager 104 determines when to compress pages of the paged memory 106. The compressed storage manager 104 can use various rules or criteria to determine which pages of the paged memory 106 are compressed, as discussed in more detail below. Generally, the compressed storage manager 104 compresses pages of the paged memory 106 into a region of the paged memory 106. The region of the paged memory 106 is made up of multiple memory pages of the paged memory 106 that are allocated to the compressed storage manager 104 by the memory manager 102. For example, the region may be 128 kilobytes and the memory pages may each be 4 kilobytes, although these values are examples and other region and/or page sizes can alternatively be used. Pages of the paged memory 106 that are being compressed into a particular region have at least similar priority levels, and the memory pages that make up a region of the paged memory 106 have at least similar priority levels as the memory pages compressed into that region. Memory pages having at least similar priority levels refer to memory pages having the same or similar priority levels.

In one or more embodiments, pages of the paged memory 106 that are being compressed into a particular region have the same priority level, and different regions are used for different priority levels. The memory pages that make up a region of the paged memory 106 have the same priority level as the memory pages compressed into that region. For example, the compressed storage manager 104 can compress the pages 204 of FIG. 2 into one region that is made up of memory pages allocated to the compressed storage manager 104 and having priority level 1. By way of another example, the compressed storage manager 104 can compress the pages 206 of FIG. 2 into another region that is made up of memory pages allocated to the compressed storage manager 104 and having priority level 3. It should be noted that for each priority level, compressed storage manager 104 can create zero or more regions made up of memory pages corresponding to that priority level.

Alternatively, pages of the paged memory 106 that are being compressed into a particular region may have similar but not necessarily the same priority levels. Which priority levels are similar can be determined in different manners, such as based on whether the priority levels are within a threshold number (e.g., 1 or 2) of levels of one another. For example, priority level 1 and priority level 2 can be similar and thus pages of priority level 1 and pages of priority level 2 can be compressed into the same region, but priority level 1 and priority level 5 may not be similar and thus pages of priority level 1 and pages of priority level 5 are not compressed into the same region.

Similarly, the memory pages that make up a region of the paged memory 106 may have similar but not necessarily the same priority levels as the memory pages compressed into that region. For example, the memory pages that make up a region of the paged memory 106 may have priority level 3, and the memory pages compressed into that region may have priority level 2 or priority level 3. Furthermore, the region can be made up of memory pages of the same or similar priority level. For example, a region may be made up of some memory pages having priority level 2 and some memory pages having priority level 3.

To create a region, the compressed storage manager 104 requests a set of pages of the paged memory 106 be allocated to the manager 104 by the memory manager 102. The allocated set of pages are classified as working or assigned pages. The compressed storage manager 104 compresses another set of pages in the paged memory 106, such as pages that are standby or re-assignable pages. The compressed storage manager 104 stores those compressed pages in the set of pages allocated to the compressed storage manager 104, and returns control of the set of pages allocated to the compressed storage manager 104 to the memory manager 102 (e.g., the set of pages are re-classified as standby or re-assignable pages) so that the set of pages allocated to the compressed storage manager 104 can be repurposed by the memory manager 102 if the memory manager 102 so desires.

Thus, for example, a particular set of pages that are compressed can be a set of standby or re-assignable pages corresponding to at least similar priority levels. That particular set of pages is compressed into an additional set of pages corresponding to at least similar priority levels. After that particular set of pages is compressed, the additional set of pages are also classified as standby or re-assignable pages. Thus, compressed storage manager 104 compresses that particular set of pages into a different set of pages of the same type (e.g., standby or re-assignable) and corresponding to at least similar priority levels. However, as the compressed storage manager 104 compresses that particular set of pages, the quantity of pages in that particular set of pages is typically greater than the quantity of pages in the compressed set of pages.

Figure 3:
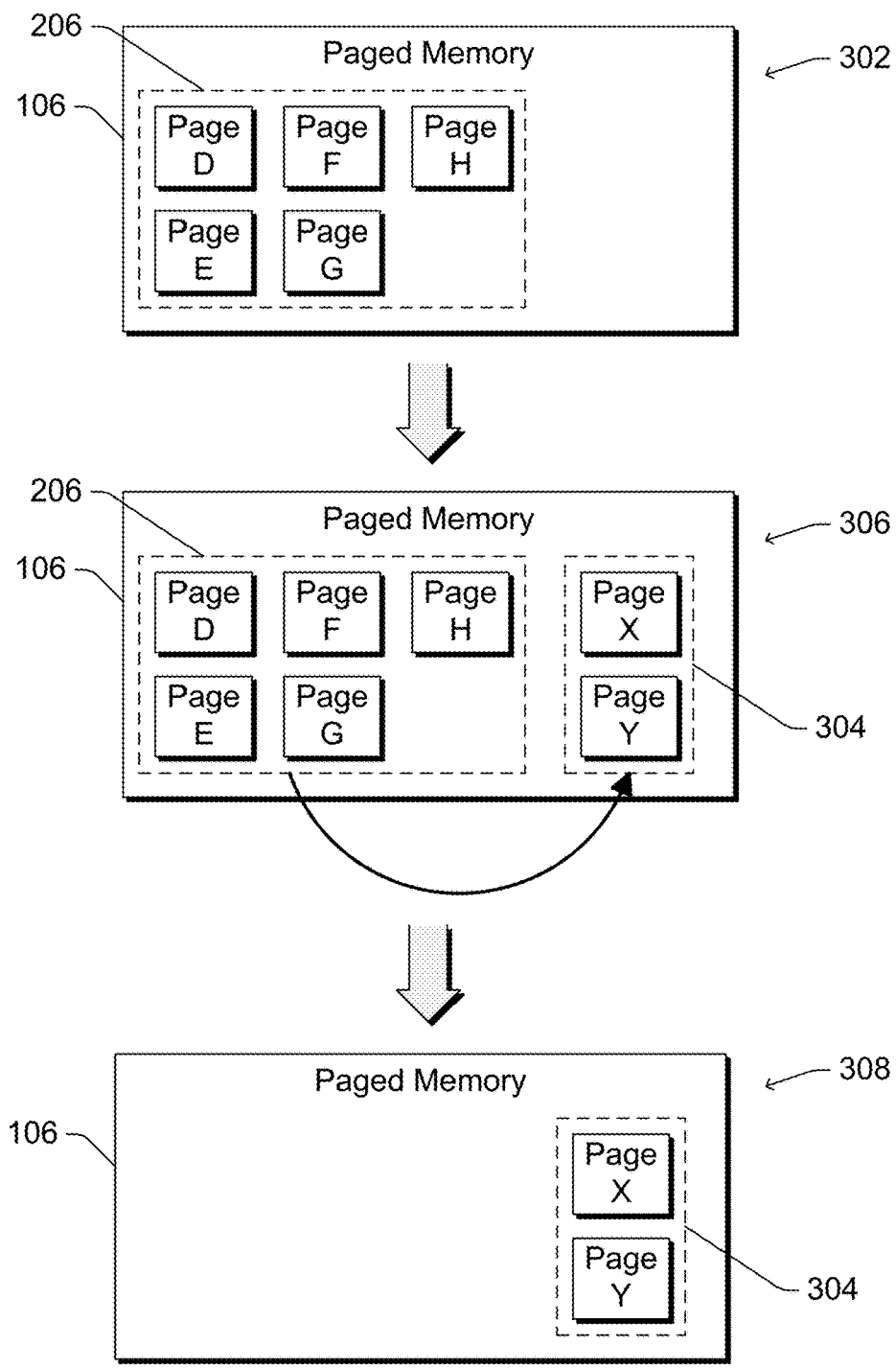
FIG. 3 illustrates an example of compressing memory pages in accordance with one or more embodiments.

FIG. 3 illustrates an example of compressing memory pages in accordance with one or more embodiments. The paged memory 106 includes five memory pages 206 having the same priority level (e.g., priority level 3 as discussed above), as illustrated at 302. The compressed storage manager 104 is allocated a region including two memory pages 304 having at least similar priority levels as the memory pages 206. The compressed storage manager 104 compresses the memory pages 206 into the memory pages 304, as illustrated at 306. After compression, the memory manager 102 can free the memory pages 206 because the compressed version of the memory pages 206 is stored in the paged memory 106 as memory pages 304. Thus, after compression the paged memory 106 stores the memory pages 304 but need not store the memory pages 206.

Figure 4:
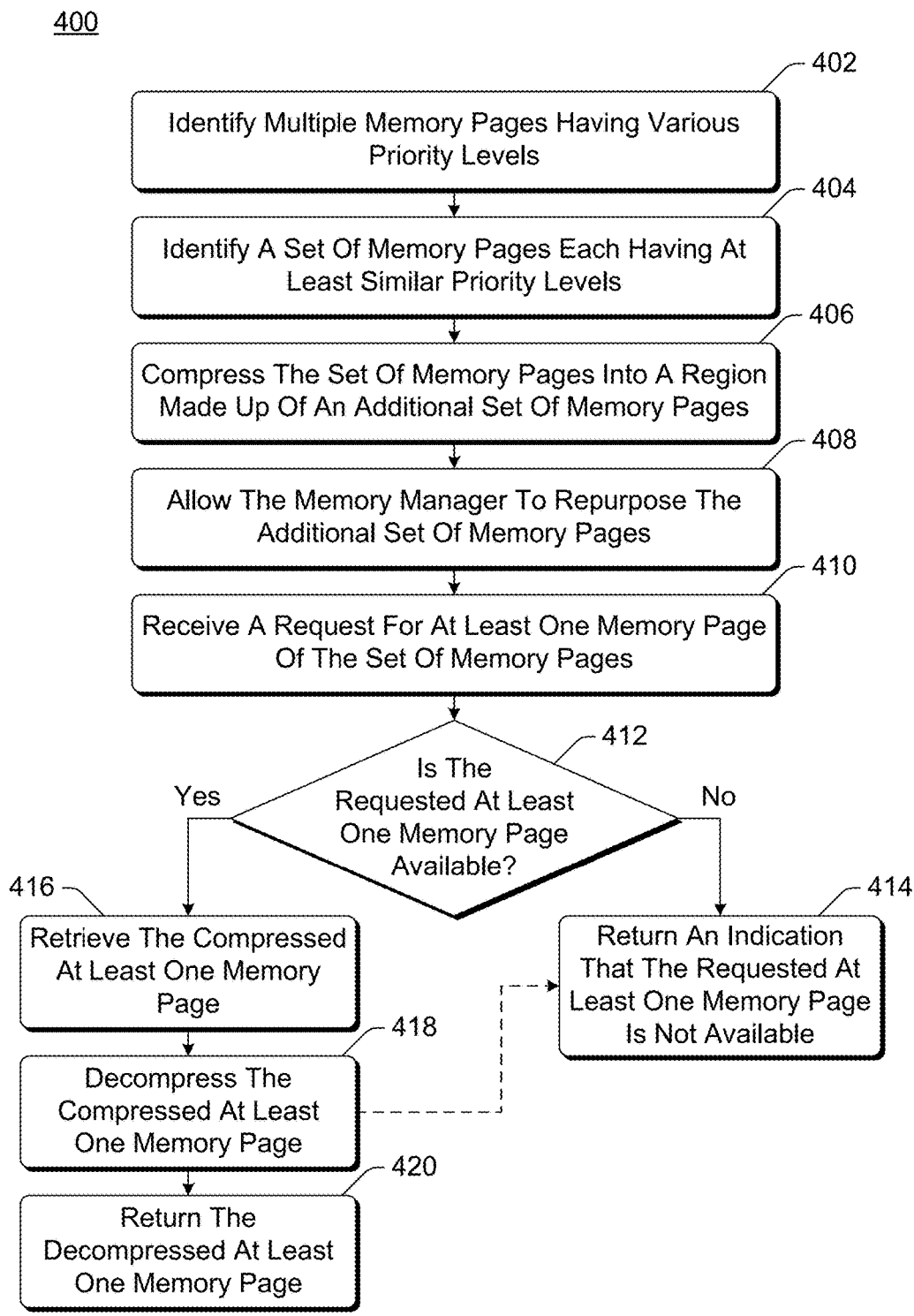
FIG. 4 is a flowchart illustrating an example process for implementing the page-based compressed storage management in accordance with one or more embodiments.

FIG. 4 is a flowchart illustrating an example process 400 for implementing the page-based compressed storage management in accordance with one or more embodiments. Process 400 is carried out by a compressed storage manager, such as compressed storage manager 104 of FIG. 1, and can be implemented in software, firmware, hardware, or combinations thereof. Process 400 is shown as a set of acts and is not limited to the order shown for performing the operations of the various acts. Process 400 is an example process for implementing the page-based compressed storage management; additional discussions of implementing the page-based compressed storage management are included herein with reference to different figures.

In process 400, multiple memory pages having various priority levels are identified (act 402). These memory pages identified in act 402 can be particular types of memory pages, such as standby or re-assignable pages. Various additional rules or criteria can also be used to identify memory pages in act 402, such as rules or criteria regarding data stored by particular types of pages, rules or criteria regarding caching attributes, and so forth as discussed in more detail below.

A set of memory pages each having at least similar priority levels is identified (act 404). This set of memory pages are pages of the multiple memory pages identified in act 402. The set of pages can be identified in various manners, such as in order of occurrence in a record or list, randomly, and so forth.

The set of memory pages identified in act 404 are compressed into a region of the paged memory (act 406). This region of the paged memory is made up of an additional set of memory pages of the paged memory that have at least similar priority levels as the set of memory pages identified in act 404. The additional set of memory pages that make up the region are allocated to the compressed storage manager by the memory manager. As part of the compressing in act 406, the compressed storage manager maintains a record of where in the region the compressed version of each memory page of the set of memory pages is stored. This record can take various forms, such as for each compressed memory page a record of which one or more memory pages allocated to the compressed storage manager store the compressed version of the memory page, for each compressed memory page a record of an address range in the region that stores the compressed version of the memory page, and so forth.

Compressing a memory page refers to compressing the content of (e.g., data stored in) the memory page. Any of a variety of different public and/or proprietary compression techniques can be used to compress a memory page. For example, a memory page can be compressed using run-length encoding compression algorithms, LZW compression algorithms, Huffman coding algorithms, and so forth. Multiple different compression algorithms can optionally be employed, such as different compression algorithms for different types of content. For example, one compression algorithm may be used for alphanumeric and/or text content, another compression algorithm may be used for image content, and another compression algorithm may be used for audio content. The compression technique used to compress a memory page is typically a lossless compression algorithm, although in certain circumstances (e.g., for certain image and/or audio content) a lossy compression algorithm may alternatively be used. The particular compression algorithm may also be device dependent, where a faster device (e.g., with a more powerful one or more processors) may be configured with a more processor-intensive compression algorithm that compresses better whereas a slower device (e.g., with a less powerful one or more processors) may be configured with a less processor-intensive algorithm that does not compress as well.

In one or more embodiments, the memory pages are compressed in act 406 individually. Alternatively, two or more memory pages can be compressed together (e.g., a compression algorithm can be run on two or more memory pages together rather than individually).

Additional processing of the memory page can also optionally be performed in act 406. This additional processing can be encrypting the content of the memory page (e.g., using symmetric key encryption, public key encryption, and so forth), generating error-detecting data such as CRC (cyclic redundancy check) data for the memory page, generating authentication information such as HMAC (Hash Message Authentication Code) data for the memory page, and so forth.

The memory manager is then allowed to repurpose the additional set of memory pages that make up the region (act 408). The memory manager can be allowed to repurpose the additional set of memory pages in different manners, such as the compressed storage manager notifying the memory manager that the additional set of memory pages are to be classified as standby or re-assignable pages. In allowing the memory manager to repurpose the additional set of memory pages in act 408, the memory manager 102 is informed that the additional set of memory pages (the data stored in the additional set of pages) need not be copied to the page file 110—the uncompressed set of memory pages would have already been copied to the page file 110 if appropriate (e.g., if dirty), so there is no need to copy the additional set of memory pages to the page file 110 as well. Thus, writing of the additional set of memory pages to the page file 110 is avoided.

Additionally, the memory manager can free the set of memory pages identified in act 404. The memory manager can free the set of memory pages after the memory pages have been compressed into the additional set of memory pages, or alternatively at earlier times (e.g., relying on being able to retrieve the set of memory pages from the page file 110 if requested). The memory manager can do whatever it desires with such free memory pages, including allocating them to various different program 108. The set of memory pages identified in act 404 can be freed because two versions of the same memory page (one version being uncompressed and one version being compressed) are typically not kept in paged memory because it is typically not an efficient use of paged memory.

In one or more embodiments, the memory manager can also maintain a record of the set of memory pages that were compressed by the compressed storage manager. In response to a subsequent request from a program for a memory page, the memory manager can check this record to determine whether to attempt to obtain the memory page from the compressed storage manager. If the record indicates that the memory page was compressed by the compressed storage manager then the memory manager can request the memory page from the compressed storage manager, and if the record indicate that the memory page was not compressed by the compressed storage manager then the memory manager can obtain the memory page from the page file rather than requesting the memory page from the compressed storage manager. Alternatively, the memory manager may maintain no such record and/or request memory pages from the compressed storage manager without regard for whether such memory pages were compressed by the compressed storage manager.

In one or more embodiments, the compressed storage manager does not allow the memory manager to repurpose the additional set of memory pages until the region made up by the additional set of memory pages is substantially filled. The region being substantially filled refers to little if any storage space remaining in the additional set of memory pages into which additional compressed memory pages could be stored. For example, at least a threshold amount of the storage space of the additional set of memory pages has been used to store the compressed memory pages.

A request can subsequently be received from the memory manager for at least one memory page of the set of memory pages that was compressed (act 410). This request can be, for example, in response to a request from a program 108 of FIG. 1 subsequently requesting access to content in the compressed memory page. The request includes an identifier of the at least one memory page, also referred to as a key.

In response to the request, a check is made as to whether the requested at least one memory page is available (act 412). As discussed above, the additional set of pages into which the memory pages are compressed can be repurposed by the memory manager. Thus, after compressing the at least one memory page, the one or more memory pages into which the at least one memory page was compressed may have been repurposed by the memory manager. The memory manager maintains records or other information allowing the memory manager to determine whether a particular page has been repurposed.

The check as to whether the requested at least one memory page is available can be performed in various manners, such as by requesting from the memory manager the one or more memory pages into which the at least one memory page was compressed. In situations in which the compressed storage manager is aware of which one or more memory pages of the region the compressed at least one memory page was stored in, the compressed storage manager can request those one or more memory pages by specifying identifiers of the one or more memory pages. In situations in which the compressed storage manager is not aware of which one or more memory pages of the region the compressed at least one memory page was stored in, the compressed storage manager can request the one or more memory pages by specifying the memory address range of the region at which the compressed at least one memory page was stored (e.g., as indicated using the data structures of FIG. 5 and/or FIG. 6 discussed below), and rely on the memory manager to identify the one or more memory pages that are allocated to the compressed storage manager and associated with the specified memory address range. In response to such a request, if all of the one or more pages are available (have not been repurposed) then the memory manager returns the requested one or more memory pages (in which case the at least one memory page is available). However, if all of the one or more pages are not available (e.g., at least one has been repurposed) then the memory manager returns an indication that the one or more memory pages have been repurposed or otherwise are not available (in which case the at least one memory page is not available).

It should be noted that if two or more memory pages are compressed together (e.g., as discussed above with reference to act 406), then the compressed storage manager would request each of those two or more memory pages, and the at least one memory page would be available only if each of those two or more memory pages were available.

If the at least one memory page is not available, then an indication that the requested at least one memory page is not available is returned to the memory manager (act 414). The memory manager can then obtain the memory page from the page file 110 or other source, just as if compressed storage manager 104 was not being used.

However, if the at least one memory page is available, then the compressed at least one memory page is retrieved (act 416). Retrieving the compressed at least one memory page refers to retrieving the one or more memory pages into which the at least one memory page was compressed. It should be noted that this retrieval of the one or more memory pages into which the at least one memory page was compressed can be inherent in determining whether the one or more memory pages into which the at least one memory page was compressed are available. For example, as discussed above with reference to act 412, the check as to whether the requested at least one memory page is available can be performed by requesting from the memory manager the one or more memory pages into which the at least one memory page was compressed, and the memory manager returns the requested one or more memory pages if they are available.

The at least one memory page is decompressed (act 418) and returned to the memory manager (act 420). The manner in which the at least one memory page is decompressed can vary based at least in part on the technique used to compress the at least one memory page. The compression of act 406 and the decompression of act 418 can optionally be performed in parallel on multiple processors and/or processor cores in order to increase access time to compressed pages. Any other processing performed on the memory page is also verified or undone in act 418, such as decrypting the memory page, verifying error-detecting data, verifying authentication information, correcting data (if possible) if this verification fails, and so forth. If error-detecting data or authentication information cannot be verified and/or the data corrected, then an indication that the requested at least one memory page is not available is returned to the memory manager (act 414) rather than the decompressed at least one memory page.

Returning to FIG. 1, each memory page has an identifier (also referred to as a key) associated with it that allows the memory pages to be distinguished from one another. This identifier can be assigned by any of various components, such as the memory manager 102 or the compressed storage manager 104. The compressed version of a memory page takes up less space in the paged memory 106 than the memory page itself, so the same data unit structure is not used by compressed storage manager 104. For example, the memory manager 102 may manage paged memory 106 by memory pages, but compressed storage manager 104 would not.

Figure 5:
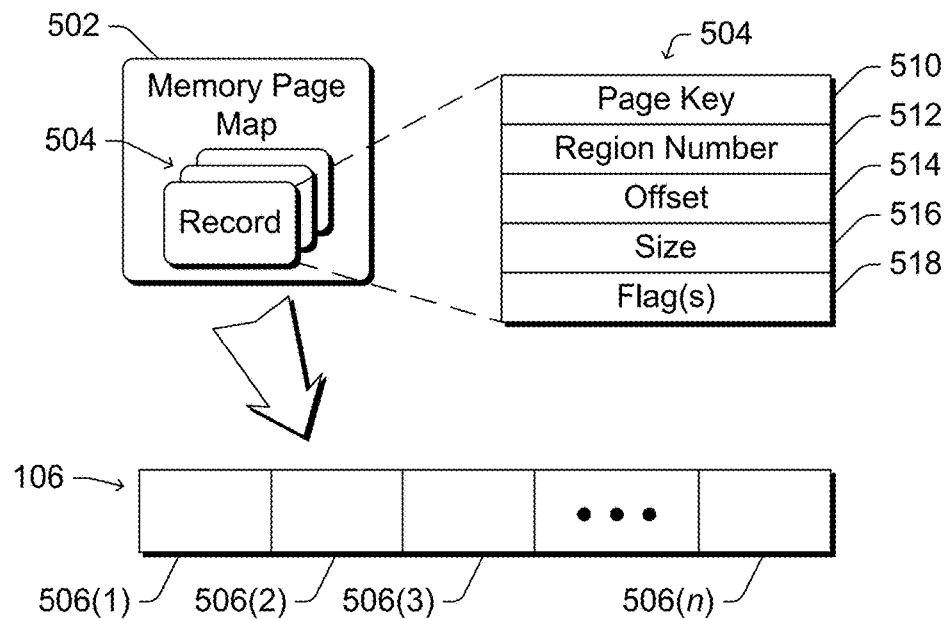
FIG. 5 illustrates an example memory page map in accordance with one or more embodiments.

The compressed storage manager 104 maintains a memory page map to identify in which regions of memory pages the various compressed memory pages are stored. FIG. 5 illustrates an example memory page map 502 in accordance with one or more embodiments. For each compressed memory page stored in the paged memory 106, the memory page map 502 maintains a corresponding record 504 identifying where that compressed memory page is stored in the regions of memory pages. The paged memory 106 is illustrated as one or more (n) different regions 506(1), ..., 506(n), each of which is itself made up of multiple memory pages as discussed above.

Each record 504 includes a page key field 510, a region number field 512, an offset field 514, a size field 516, and a flag(s) field 518. The page key field 510 stores the identifier of the corresponding compressed memory page. This identifier can take any of a variety of different forms. For example, it could be a process identifier and virtual address, a record identifier, and so forth.

The region number field 512 stores an identifier of the particular region 506 in which the corresponding compressed memory page is stored. Although typically a number, this region could be identified in any of a variety of other manners. The offset field 514 stores an identifier of an offset into the particular region 506 where storage of the data for the corresponding compressed memory page begins. Alternatively, rather than region and offset identifiers, one or more fields storing any other identifier(s) of the location in the compressed portion where the corresponding compressed memory page is stored could be used.

The size field 516 stores an identifier of the size (e.g., in bytes) of the corresponding compressed memory page. Given the region, the offset into the particular region, and the size of the compressed memory page, a memory address range at which the compressed memory page is stored can be readily identified. The flag(s) field 518 stores various state information regarding the corresponding compressed memory page. Examples of such flags include a selection priority for the memory page used to determine which memory pages are selected to be compressed, a priority level corresponding to the memory page, an indication of whether the memory page was accessed when the user was last logged in or last actively using the system 100 of FIG. 1, which component selected or added the memory page for compression (e.g., the compressed storage manager or the memory manager), and so forth.

It is to be appreciated that the memory page map 502 is only an example. In other embodiments, additional fields can be included in each record of the map 502. For example, error-detecting data such as CRC data, authentication information such as HMAC data, information describing the use history and/or frequency of the memory page, and so forth can be included in each record of the map 502. Furthermore, one or more of the fields 510-518 can be omitted from the records of the map 502. Additionally, it should be noted that the data in one or more of the fields 510-518 can be stored with the memory page in paged memory 106 rather than in a separate record.

In addition to the memory page map 502, the compressed storage manager 104 also maintains a region map to identify what memory page is stored in a particular location of a region. Thus, the memory page map 502 operates to identify where an identified compressed memory page is stored, whereas the region map operates to identify which compressed memory page is stored in a given location of a region.

Figure 6:
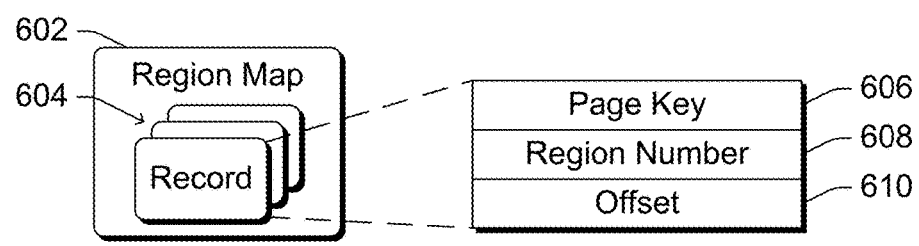
FIG. 6 illustrates an example region map in accordance with one or more embodiments.

FIG. 6 illustrates an example region map 602 in accordance with one or more embodiments. For each offset into a region where a different memory page is stored, the region map 602 maintains a record 604 identifying the corresponding compressed memory page stored at that offset. Each record 604 includes a page key field 606, a region number field 608, and an offset field 610.

The page key field 606 stores the identifier of the corresponding compressed memory page, analogous to page key field 510 of record 504 of FIG. 5. The region number field 608 stores an identifier of the particular region 506 in which the corresponding compressed memory page is stored, analogous to the region number field 512 of record 504. The offset field 610 stores an identifier of an offset into the particular region 506 where storage of the data for the corresponding compressed memory page begins, analogous to the offset field 514 of record 504. Alternatively, rather than region and offset identifiers, one or more fields storing any other identifier(s) of the location in the compressed portion where the corresponding compressed memory page is stored could be used.

It is to be appreciated that the region map 602 is only an example. In other embodiments, additional fields can be included in each record of the map 602, and/or one or more of the fields 606-610 can be omitted from the records of the map 602. Additionally, it should be noted that the data in one or more of the fields 606-610 can be stored with the memory page in paged memory 106 of FIG. 1 rather than in a separate record.

The memory page map 502 of FIG. 5 and the region map 602 of FIG. 6 can be implemented in any of a variety of different manners. In one or more embodiments, these maps are each implemented as a B+-tree for increased performance in accessing the individual records. Alternatively, any of a variety of other conventional data structures can be used to implement these maps, such as AVL trees, hash table, arrays, and so forth.

Returning to FIG. 1, as discussed above the memory manager 102 is able to copy the contents of some memory pages to the page file 110. By copying the contents of a memory page to the page file 110, the memory manager 102 knows it can repurpose or otherwise lose the content of the memory page in paged memory 106 because the content can be retrieved from the page file 110 if desired.

In one or more embodiments the memory manager 102 supports functionality allowing pages to be marked as being clean (e.g., not modified) and thus acceptable for the memory manager 102 to lose. Losing a memory page (or the memory page being lost) refers to that memory page being repurposed or the content of the memory page otherwise deleted or rendered inaccessible. By marking a memory page as clean, the memory manager 102 knows that the memory page can be lost because a version of the memory page is stored elsewhere (e.g., copied to the page file 110). The memory manager 102 maintains a record (e.g., a list, a flag associated with each memory page, etc.) of the memory pages that are clean. In one or more embodiments, the process of identifying to the memory manager that a memory page is to be marked as being clean is referred to as performing a memory reset on the memory page.

A memory page marked as clean can subsequently have that marking changed to being dirty (e.g., modified), causing the memory page to be treated as dirty and thus unacceptable to lose. In response to marking a memory page as dirty, the memory manager 102 does not repurpose or otherwise lose the content of the memory page until the memory page is copied to the page file 110. This marking cannot be changed, however, if the memory page has already been lost. For example, if a memory page is marked as clean, the memory manager 102 may repurpose the page prior to a subsequent attempt to mark the memory page as dirty, in which case the memory page is lost and thus is not marked as dirty. In one or more embodiments, the process of identifying to the memory manager that a memory page is to be marked as being dirty is referred to as performing a memory reset undo on the memory page.

In one or more embodiments, the compressed storage manager 104 leverages this functionality of the memory manager 102 in managing compression of memory pages. As discussed above with respect to act 408 of FIG. 4, the memory manager is allowed to repurpose the additional set of memory pages that make up a region. The memory manager can be allowed to repurpose the additional set of memory pages by the compressed storage manager 104 performing a memory reset on the additional set of memory pages. In response to performing the memory reset on the additional set of memory pages, the memory manager 102 does not copy the memory pages to the page file 110, and treats the memory pages as acceptable to lose (e.g., classifies the memory pages as standby or re-assignable pages).

Furthermore, as discussed above with respect to acts 412 and 416 of FIG. 4, a request for one or more memory pages into which at least one memory page was compressed can be made to the memory manager. This request can be the compressed storage manager 104 performing a memory reset undo on the one or more memory pages. In response to performing the memory reset undo on the one or more memory pages, if the one or more memory pages have already been lost then the memory manager 102 returns an indication to the compressed storage manager 104 that the one or more memory pages have been lost. However, if the one or more memory pages have not already been lost, then the memory manager returns the one or more memory pages to the compressed storage manager 104, and treats the one or more memory pages as dirty (e.g., classifies the one or more memory pages as modified or dirty, and no longer standby or re-assignable).

It should be noted that the memory reset undo is performed on the one or more memory pages into which the at least one memory page that has been requested was compressed—the memory reset undo need not be performed on all of the memory pages of the region that includes the one or more memory pages. It should also be noted that the returning of the one or more memory pages to the compressed storage manager 104 is done atomically to prevent any of the one or more memory pages from being repurposed while being returned to the compressed storage manager 104.

It should further be noted that, after performing a memory reset undo on the one or more memory pages, decompressing the at least one memory page compressed on the one or more memory pages, and returning the decompressed at least one memory page to the memory manager 102, the compressed storage manager 104 can again perform a memory reset on the one or more memory pages (also referred to as re-resetting the one or more memory pages). The returned at least one memory page is classified as a type of memory page that is unacceptable to lose until copied to the page file 110 (e.g., classified as a working or assigned page, or alternatively a modified or dirty page). By performing the memory reset undo, the one or more pages on which the at least one memory page was compressed would be marked as dirty, which is not needed because the uncompressed at least one memory page is already classified as a type that is unacceptable to lose. Thus, the compressed storage manager 104 can again perform a memory reset on the one or more memory pages (e.g., re-resetting the one or more memory pages), avoiding the situation where the memory manager 102 would copy the memory pages to the page file 110, and allowing the memory manager 102 to again treat the one or more memory pages as acceptable to lose.

The re-resetting of memory pages can be performed at various times. In one or more embodiments, the compressed storage manager 104 maintains a record of memory pages of the regions of compressed memory pages that are to be re-reset. This record can take various forms, such as a bitmap associated with each region, each bit of a bitmap corresponding to a memory page that makes up part of the region and indicating whether the corresponding memory page is to be re-reset. The record can be updated approximately concurrently with (or within a threshold amount of time before or after) returning the decompressed at least one memory page to the memory manager 102. The compressed storage manager 104 (e.g., a process of the manager 104) runs subsequently at a low processor priority level and/or in the background, such as at times of low system resource usage (e.g., low processor utilization or low rates of access to the paged memory 106) to re-reset the memory pages that are to be re-reset as indicated by the maintained record. By waiting to re-reset the memory pages, the compressed storage manager 104 avoids accessing the memory manager 104 and interfering with the speed at which the memory manager returns the decompressed at least one memory page to the program 108 that requested the at least one memory page.

Alternatively, the re-resetting of memory pages can be performed at other times, such as approximately concurrently with or shortly after returning the decompressed at least one memory page to the memory manager 102.

It should be noted that other maintenance type tasks can also be performed by the compressed storage manager 104 running at a low processor priority level and/or in the background. Various different types of maintenance tasks can be performed by the compressed storage manager 104, such as compaction of the regions storing compressed memory pages in the paged memory 106 as discussed in more detail below.

In one or more embodiments, the compressed storage manager 104 uses various rules or criteria to identify which memory pages can be compressed (e.g., as in act 402 of FIG. 4). The rules or criteria can identify memory pages in various different manners, such as based on memory page classification (e.g., standby or re-assignable pages), memory pages having particular types of data stored on them (e.g., pages (which may be referred to as private pages) allocated to a process for its data storage, pages including data from a library or other file opened by a process, etc.), caching attributes of pages (e.g., whether pages are CPU-cacheable), and so forth. The rules or criteria can additionally or alternatively identify memory pages based on data access and usage patterns in the system 100, random or pseudo-random selection of memory pages, and so forth.

In one or more embodiments, the compressed storage manager 104 uses various rules or criteria to identify a set of which of those identified memory pages to compress (e.g., as in act 404 of FIG. 4). The rules or criteria can identify a set of memory pages in various different manners, such as based on data access and usage patterns in the system 100, in order of occurrence in a record or list (e.g., in the order in which the memory pages were added to a standby list), randomly or pseudo randomly, and so forth. It should be noted that a memory page that is part of a region that already stores compressed memory pages is not selected as a memory page to compress. All of the identified memory pages can be compressed, or alternatively a subset of the memory pages can be compressed (e.g., a particular number of memory pages, memory pages corresponding to one or more particular priority levels, and so forth).

The determination of when to compress memory pages can be made in a variety of different manners. In one or more embodiments, a service or program runs at regular or irregular intervals (e.g., approximately every several or ten minutes) to identify the memory pages to be compressed. Alternatively, the service or program can be run in response to other events, such as an amount of memory pages of a particular type being present in the paged memory 106, at times of low system resource usage (e.g., low processor utilization or low rates of access to the paged memory 106), and so forth.

In one or more embodiments, the compressed storage manager 104 leverages the functionality of multiple processors and/or processor cores that are included in a device implementing the system 100. The compressed storage manager 104 can spawn and/or use multiple threads to leverage the multiple processors and/or processor cores, each individual thread being able to access the paged memory 106 and multiple threads being able to access the paged memory 106 concurrently. Each such individual thread performs the acts of compressing a set of memory pages (e.g., acts 404-408 of FIG. 4 discussed above) and/or the acts of decompressing a set of memory pages (e.g., acts 410-420 of FIG. 4 discussed above). Each different thread can be executed by a different processor and/or processor core, allowing multiple acts of compressing and/or decompressing to be performed concurrently. For example, three threads may execute concurrently, one thread performing acts of compressing one set of memory pages, a second thread performing acts of decompressing at least one memory page in response to a request from one program, and a third thread performing acts of decompressing a different at least one memory page in response to a different request from a different program.

Similarly, in one or more embodiments the compressed storage manager 104 supports pre-fetching of compressed memory pages. Pre-fetching refers to a single or concurrent request for multiple memory pages, which can result in a request for numerous compressed memory pages concurrently. The compressed storage manager 104 can support pre-fetching of compressed memory pages in various manners. In one or more embodiments, the compressed storage manager 104 includes a pre-fetching thread that manages the spawning and/or use of additional threads that perform the acts of decompressing. The pre-fetching thread specifies to the additional threads which of the memory pages the acts of decompressing are to be performed for, and the additional threads perform the acts of decompressing for the memory pages specified by the pre-fetching thread. The multiple additional threads can run concurrently on different processors and/or processor cores, allowing the multiple processors and/or processor cores that are included in a device implementing the system 100 to be leveraged to perform the decompression associated with pre-fetching memory pages more quickly than using a single processor and/or processor core.

In one or more embodiments, the compressed storage manager 104 maintains a record of memory pages of the regions of compressed memory pages that are available and/or compressed memory pages that are not available. This record can take various forms, such as a bitmap associated with each region, each bit of a bitmap corresponding to a compressed memory page compressed into that region and indicating whether the corresponding memory page is available. The compressed storage manager 104 (e.g., a process of the manager 104) runs at a low processor priority level and/or in the background, such as at times of low system resource usage (e.g., low processor utilization or low rates of access to the paged memory 106) to determine which memory pages are no longer available. This determination can be made in various manners, such as by requesting from the memory manager 102 the one or more memory pages into which a memory page is compressed (the memory page is available if the one or more memory pages into which the memory page is compressed is returned by the memory manager 102, and otherwise is not available). By maintaining this record of compressed memory pages that are not available, the compressed storage manager 104 can more quickly respond to some requests from the memory manager 102 for memory pages. For example, if a request is received from the memory manager 102 for a memory page that is not available as indicated by the record maintained by the compressed storage manager 104, an indication that the memory page is not available can be returned by the compressed storage manager 104 without spending time in an attempt to retrieve the one or more memory pages into which the requested memory page is compressed.

In one or more embodiments, the compressed storage manager 104 also compacts the regions storing compressed memory pages in the paged memory 106. Over time, memory pages that were compressed and stored in a region can be removed from the region. Such removals can occur for a variety of reasons. For example, a program may request access to a memory page that is stored in a region. In response to such a request, the compressed storage manager 104 removes the compressed memory page from the region, decompresses the memory page, and returns the memory page to the memory manager 102 as discussed above.

Removal of compressed memory pages from a region results in empty gaps or blocks within the memory pages of the regions storing compressed memory pages. During the compaction process, the compressed storage manager 104 consolidates the remaining compressed memory pages so that these empty gaps or blocks are filled.

The compressed storage manager 104 keeps track of how well the regions are being utilized. A value representing how well the regions are being utilized is determined based on how much data is stored in the memory pages of the regions (e.g., the summation of the sizes of all the compressed memory pages stored in the memory pages of the region) and the current size of the region (the summation of the sizes of the memory pages of the region that are still available). If the difference or ratio of these two values exceeds a threshold value, then the compressed storage manager 104 determines that compaction should be performed. This compaction threshold value can be a fixed or variable amount, 10% of the current size of the region, zero, and so forth. In other embodiments, compaction is performed whenever there are any empty gaps or blocks in any of the memory pages of the regions.

Compaction is performed by relocating compressed memory pages from one memory page of a region to another memory page of the same or different region. The size of the various compressed memory pages in each memory page can be readily determined by accessing the data structures used by the compressed storage manager 104 (e.g., as discussed above with respect to FIG. 5). In one or more embodiments, compressed memory pages within a particular region are compacted together (e.g., at the beginning or ending of the region) so that all of the empty gaps in that region are together. This can result in a larger gap in a region rather than several smaller gaps, and allow for a larger compressed memory page to be relocated within that region. Alternatively, such intra-region compaction may not be performed, and compressed memory pages may simply be relocated into the existing gaps in regions.

Compaction can result in the compressed memory pages from a region(s) being relocated to one or more other regions, and thus emptying the memory pages of a region. Once a memory page of a region is emptied, the compressed storage manager 104 can compress and store additional memory pages (of at least similar priority levels) into that memory page, or release that memory page to the memory manager 102 (e.g., freeing that memory page).

The determination of which compressed memory pages are to be relocated into which regions can be made in any of a variety of manners. For example, compressed memory pages from the region having the most empty gaps (and thus the smallest amount of data in its memory pages) can be selected for relocation first as the compressed storage manager 104 is more likely to be able to relocate all the compressed memory pages from that region into other regions. By way of another example, larger compressed memory pages may be selected first to avoid filling larger gaps with smaller compressed memory pages. By way of another example, the compressed memory pages may be selected for relocation so as to reduce the amount of copying from one region to another. By way of yet another example, the age of regions may be taken into account in determining which compressed memory pages are to be relocated. The age of a compressed memory page refers to an amount of time that the compressed memory page has been compressed and stored in a region. The age of a region refers to, for example, the average, maximum, and/or minimum age of the compressed memory pages in that region.

The threshold value for compaction can be a fixed amount (e.g., no more than 25% of the current size of a region should be empty gaps), or alternatively can be a dynamic amount. This dynamic amount can vary based on different criteria, such as the compressibility of compressed memory pages stored in the regions (e.g., better compressibility of compressed memory pages could increase the empty gaps permitted in the regions), the resource pressure in the system 100 (e.g., higher pressure could reduce the empty gaps permitted in the regions), and so forth. Various other criteria regarding a current state of the system 100 can also be used in varying the threshold value for compaction, such as hit rates (e.g., how frequently memory pages in the region are accessed), time of day or other user context (e.g., early morning, during lunch, after lunch, etc.), battery life, and so forth. For example, if processor usage is very high, the empty gaps permitted in the regions can be increased in order to reduce the burden of the processor in relocating memory pages. By way of another example, if the power state in the system 100 indicates that power should be conserved, or if the battery level is low, then the empty gaps permitted in the regions can be increased in order to reduce the power consumption of the processor by requiring fewer compressed memory pages to be relocated.

The compressed storage manager 104 can determine whether to compact regions at different times. For example, the compressed storage manager 104 may make the determination at regular or irregular intervals. By way of another example, the compressed storage manager 104 may make the determination in response to different events in the system 100, such as the processor being idle for a threshold amount of time, an indication that resource pressure in the system 100 is increasing, and so forth.

The techniques discussed herein support various functionality. One such functionality is that data in paged memory is compressed and kept in paged memory, thereby reducing the amount of paged memory used to store the data. No paged memory need be lost using the techniques discussed herein (e.g., data in paged memory is not exchanged for compressed data in non-paged memory). Another such functionality is that the compressed memory pages are stored in the paged memory at at least similar priority levels as those memory pages were prior to compression. By maintaining at least similar priority levels of memory pages, priority inversion scenarios in which significantly higher priority memory pages are lost prior to losing lower priority memory pages are avoided.

Furthermore, the techniques discussed herein maintain the classification of memory pages. Compressed memory pages are stored as the same type of memory pages (e.g., standby or re-assignable) as those memory pages were prior to compression. Thus, there is no perception or indication of losing available memory in the system due to the compression.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 7:
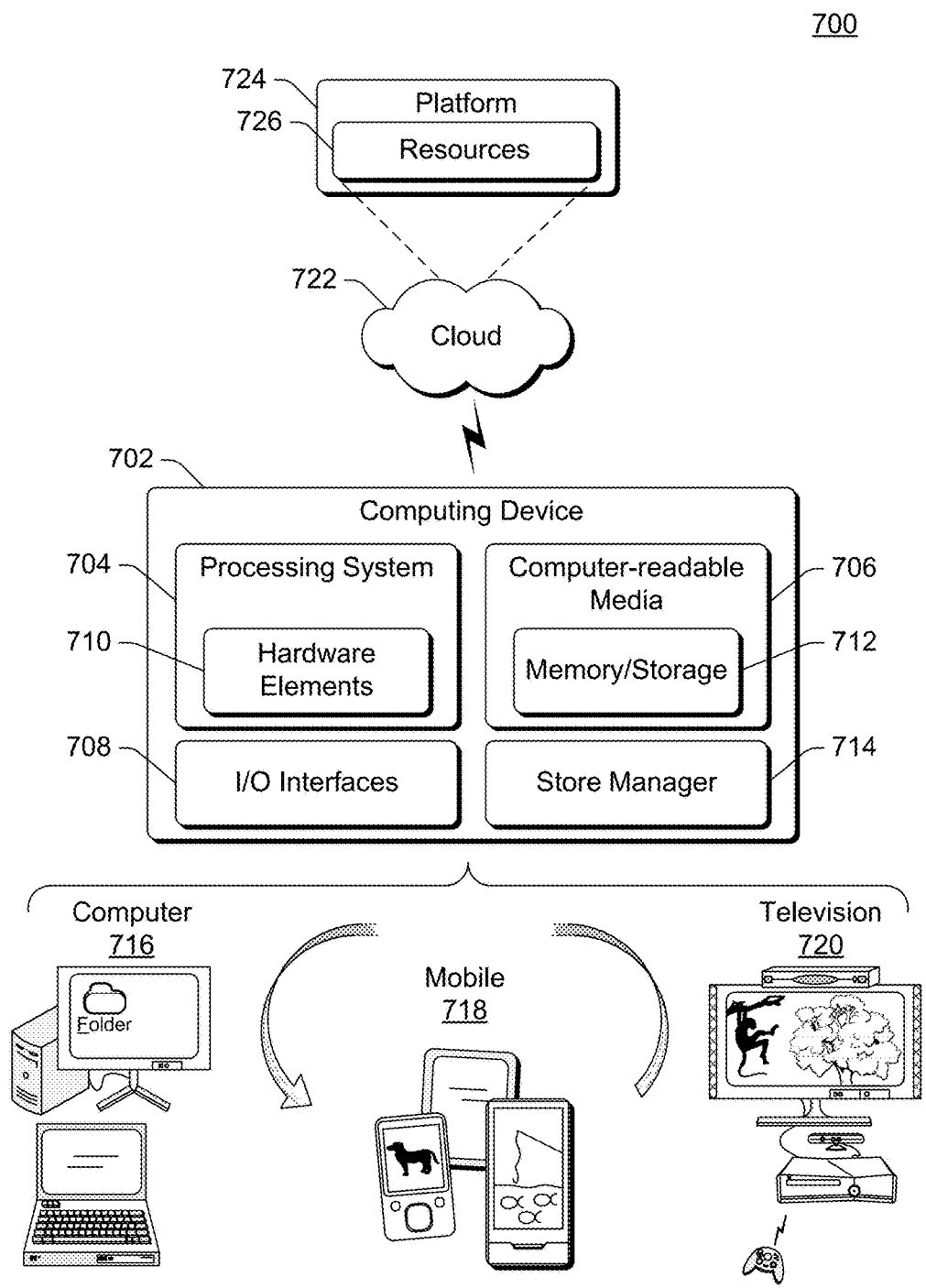
FIG. 7 illustrates an example system that includes an example computing device that is representative of one or more systems and/or devices that may implement the various techniques described herein.

FIG. 7 illustrates an example system generally at 700 that includes an example computing device 702 that is representative of one or more systems and/or devices that may implement the various techniques described herein. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O Interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

Computing device 702 also includes a store manager 714. Store manager 714 provides various page-based compression management functionality as discussed above. Store manager 714 can implement, for example, the compressed storage manager 104 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 702 may assume a variety of different configurations, such as for computer 716, mobile 718, and television 720 uses. Each of these configurations includes devices that may have generally different constructs and capabilities, and thus the computing device 702 may be configured according to one or more of the different device classes. For instance, the computing device 702 may be implemented as the computer 716 class of a device that includes a personal computer, desktop computer, a multi-screen computer, laptop computer, netbook, and so on.

The computing device 702 may also be implemented as the mobile 718 class of device that includes mobile devices, such as a mobile phone, portable music player, portable gaming device, a tablet computer, a multi-screen computer, and so on. The computing device 702 may also be implemented as the television 720 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This functionality may also be implemented all or in part through use of a distributed system, such as over a "cloud" 722 via a platform 724 as described below.

The cloud 722 includes and/or is representative of a platform 724 for resources 726. The platform 724 abstracts underlying functionality of hardware (e.g., servers) and software resources of the cloud 722. The resources 726 may include applications and/or data that can be utilized while computer processing is executed on servers that are remote from the computing device 702. Resources 726 can also include services provided over the Internet and/or through a subscriber network, such as a cellular or Wi-Fi network.

The platform 724 may abstract resources and functions to connect the computing device 702 with other computing devices. The platform 724 may also serve to abstract scaling of resources to provide a corresponding level of scale to encountered demand for the resources 726 that are implemented via the platform 724. Accordingly, in an interconnected device embodiment, implementation of functionality described herein may be distributed throughout the system 700. For example, the functionality may be implemented in part on the computing device 702 as well as via the platform 724 that abstracts the functionality of the cloud 722.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   identifying a first set of memory pages, each of the first set of memory pages having a priority level that is the same as a priority level assigned by an operating system to a process or thread that requested allocation of the memory page;
   requesting a second set of memory pages having a same priority level as each memory page of the first set of memory pages be allocated to a compressed store manager;
   compressing the first set of memory pages into a region made up of the second set of memory pages, each memory page of the second set of memory pages being of the same type as each memory page of the first set of memory pages;
   in response to determining the region is substantially filled with compressed memory pages, identifying the second set of memory pages as to be marked as being clean, the region being substantially filled when at least a threshold amount of storage space in the second set of memory pages has been used to store the compressed memory pages;
   receiving, from a program, a request for accessing at least one memory page of the first set of memory pages;
   receiving, subsequently, from the memory manager, a request for the at least one memory page of the first set of memory pages; and
   in response to the requests:
      retrieving the compressed at least one memory page by identifying, to the memory manager, that one or more of the second set of memory pages that store the compressed at least one memory page are to be marked as dirty;
      decompressing the compressed at least one memory page;
      returning the decompressed at least one memory page to the memory manager; and
      identifying each of the one or more of the second set of memory pages as clean, including waiting to identify each of the one or more of the second set of memory pages as clean until after returning the decompressed at least one memory page to avoid interfering with the memory manager returning the decompressed at least one memory page to the program.

2. The method as recited in claim 1, the identifying the second set of memory pages as to be marked as being clean comprising identifying each of the second set of memory pages as clean to avoid the memory manager copying the second set of memory pages to a page file.

3. The method as recited in claim 1, further comprising returning to the memory manager, rather than the decompressed at least one memory page, an indication that the at least one memory page is not available in response to the memory manager returning an indication that the one or more of the second set of memory pages is not available.

4. The method as recited in claim 1, further comprising using multiple threads that each perform the identifying the first set of memory pages, compressing the first set of memory pages, and identifying the second set of memory pages as to be marked as being clean for different sets of memory pages concurrently.

5. The method as recited in claim 1, further comprising using multiple threads that each perform the retrieving, decompressing, and returning for different memory pages concurrently.

6. The method as recited in claim 5, the different memory pages comprising different memory pages identified in a single request for multiple memory pages.

7. The method as recited in claim 1, further comprising:
   maintaining a record of which memory pages of the second set of memory pages are available;
   checking the record in response to the requests; and
   returning to the memory manager, rather than the decompressed at least one memory page, an indication that the at least one memory page is not available in response to the record indicating the one or more of the second set of memory pages that store the compressed at least one memory page are not available.

8. The method as recited in claim 1, further comprising compacting the region to fill empty gaps in the region.

9. A computing device comprising:
   a memory;
   a memory manager configured to manage pages of the memory; and
   a compressed storage manager configured to:
      identify multiple memory pages, each of the multiple memory pages having a corresponding priority level of multiple priority levels;
      identify a first set of memory pages each having a same priority level of the multiple priority levels, each of the first set of memory pages having a priority level that is the same as a priority level assigned by an operating system of the computing device to a process or thread that requested allocation of the memory page;
      request a second set of memory pages be allocated to the compressed store manager, the second set of memory pages having a same priority level as each memory page of the first set of memory pages;
      compress the first set of memory pages into a region made up of the second set of memory pages, each memory page of the second set of memory pages being of the same type as each memory page of the first set of memory pages;
      in response to determining the region is substantially filled with compressed memory pages, identify the second set of memory pages as to be marked as being clean, the region being substantially filled when at least a threshold amount of storage space in the second set of memory pages has been used to store the compressed memory pages;

receive, from the memory manager in response to a request for accessing at least one memory page of the first set of memory pages received by the memory manager from a program, a request for at least one memory page of the first set of memory pages; and in response to the requests, retrieve the compressed at least one memory page by identifying, to the memory manager, that one or more of the second set of memory pages that store the compressed at least one memory page are to be marked as dirty, decompress the compressed at least one memory page, return the decompressed at least one memory page to the memory manager, and identify each of the one or more of the second set of memory pages as clean after retrieving the one or more of the second set of memory pages, including waiting to identify each of the second set of memory pages as clean until after returning the decompressed at least one memory page to avoid interfering with the memory manager returning the decompressed at least one memory page to the program.

10. The computing device as recited in claim 9, the compressed storage manager being further configured to repeat identification of a set of memory pages, compression of the set of memory pages, and identifying the second set of memory pages as to be marked as being clean for memory pages in each of the multiple priority levels.

11. The computing device as recited in claim 9, wherein to identify the second set of memory pages as to be marked as being clean is to identify each of the second set of memory pages as to be marked as being clean to avoid the memory manager copying the second set of memory pages to a page file.

12. The computing device as recited in claim 9, the compressed storage manager being further configured to return to the memory manager, rather than the decompressed at least one memory page, an indication that the at least one memory page is not available in response to the memory manager returning an indication that the one or more of the second set of memory pages is not available.

13. A computing device comprising:

one or more processors; and one or more computer-readable storage media having stored thereon multiple instructions that, when executed by the one or more processors, cause the one or more processors to:

identify a first set of memory pages each having a particular one priority level of multiple priority levels, each of the first set of memory pages having a priority level that is the same as a priority level assigned by an operating system of the computing device to a process or thread that requested allocation of the memory page;

request a second set of memory pages be allocated to a compressed store manager, the second set of memory pages having the particular one priority level;

compress the first set of memory pages into a region made up of the second set of memory pages, each memory page of the second set of memory pages being classified as the same type as each memory page of the first set of memory pages;

in response to determining the region is substantially filled with compressed memory pages, identify the second set of memory pages as to be marked as being clean, the region being substantially filled when at least a threshold amount of storage space in the second set of memory pages has been used to store the compressed memory pages;

receive, from a program, a request for accessing at least one memory page of the first set of memory pages;

receive, subsequently, from the memory manager, a request for the at least one memory page of the first set of memory pages;

check whether the at least one memory page is available;

in response to the at least one memory page being available, retrieve the compressed at least one memory page by identifying, to the memory manager, that one or more of the second set of memory pages that store the compressed at least one memory page are to be marked as dirty, decompress the compressed at least one memory page, return the decompressed at least one memory page to the memory manager, and identify each of the one or more of the second set of memory pages as clean after retrieving the one or more of the second set of memory pages, including waiting to identify each of the second set of memory pages as clean until after returning the decompressed at least one memory page to avoid interfering with the memory manager returning the decompressed at least one memory page to the program; and in response to the at least one memory page not being available, return an indication to the memory manager that the at least one memory page is not available.

14. The method as recited in claim 1, the type of each memory page of the second set of memory pages comprising a standby type or a re-assignable type.

15. The computing device as recited in claim 13, wherein to identify the second set of memory pages as to be marked as being clean includes identifying each of the second set of memory pages as clean to avoid the memory manager copying the second set of memory pages to a page file.

16. The computing device as recited in claim 13, wherein the multiple instructions are executed using multiple threads that each perform the identifying the first set of memory pages, compressing the first set of memory pages, and identifying the second set of memory pages as to be marked as being clean for different sets of memory pages concurrently.

17. The computing device as recited in claim 13, wherein the multiple instructions are executed using multiple threads that each perform the retrieving, decompressing, and returning for different memory pages concurrently.

18. The computing device as recited in claim 17, the different memory pages comprising different memory pages identified in a single request for multiple memory pages.

19. The computing device as recited in claim 13, the multiple instructions further causing the one or more processors to:

maintain a record of which memory pages of the second set of memory pages are available; and check whether the at least one memory page is available by checking the record in response to the requests.

20. The computing device as recited in claim 13, the type of each memory page of the second set of memory pages comprising a standby type or a re-assignable type.

* * * * *